US008280856B2

(12) United States Patent
Rohan et al.

(10) Patent No.: US 8,280,856 B2
(45) Date of Patent: Oct. 2, 2012

(54) TAXONOMY MAPPING

(75) Inventors: Michael L. Rohan, Greenwood Village, CO (US); Emily Huang, Englewood, CO (US); Rob Blake, Lone Tree, CO (US)

(73) Assignee: Rivet Software, Inc., Englewood, CO (US)

( * ) Notice: Subject to any disclaimer, the term of this patent is extended or adjusted under 35 U.S.C. 154(b) by 0 days.

(21) Appl. No.: 12/885,227

(22) Filed: Sep. 17, 2010

(65) Prior Publication Data

US 2011/0231373 A1 Sep. 22, 2011

Related U.S. Application Data

(62) Division of application No. 11/848,177, filed on Aug. 30, 2007, now Pat. No. 7,822,769.

(60) Provisional application No. 60/824,280, filed on Aug. 31, 2006.

(51) Int. Cl.
*G06F 17/30* (2006.01)

(52) U.S. Cl. ......................... 707/687; 707/756; 707/791

(58) Field of Classification Search .................. 707/687, 707/756, 791

See application file for complete search history.

(56) References Cited

U.S. PATENT DOCUMENTS 7,415,482 B2 8/2008 Blake et al.
7,822,769 B2 10/2010 Rohan et al.
2005/0108286 A1* 5/2005 Kuki .......................... 707/104.1
2005/0197931 A1* 9/2005 Gupta ............................. 705/30
2005/0203943 A1* 9/2005 Su et al. ........................ 707/102
2005/0228774 A1* 10/2005 Ronnewinkel .................... 707/2
2006/0004735 A1* 1/2006 Dettinger et al. ................. 707/4
2006/0155697 A1* 7/2006 Rosengard ........................ 707/6
2007/0250487 A1 10/2007 Reuther
2008/0201319 A1* 8/2008 McNamar ......................... 707/5
2008/0212504 A1* 9/2008 Venkataraman et al. ..... 370/310
2009/0006472 A1 1/2009 Bush et al.

OTHER PUBLICATIONS

Aslam et al., Use of Taxonomy of Security Faults, Sep. 1, 1996, 12 pages.*

Anthony Sulistio et al., A Taxonomy of Computer-based simulation and its mapping to parallel and distributed systems simulation tools, 2004, 21 pages.

Final Office Action for U.S. Appl. No. 11/848,177, mailed Apr. 19, 2010, 7 pages. (200).

Non-Final Office Action for U.S. Appl. No. 11/848,177, mailed Jul. 8, 2009, 6 pages. (200).

* cited by examiner

*Primary Examiner* — Robert Beausoliel, Jr.
*Assistant Examiner* — Noosha Arjomandi
(74) *Attorney, Agent, or Firm* — Hamilton, DeSanctis & Cha LLP

(57) ABSTRACT

Systems and methods for mapping extension taxonomy elements to a standard base taxonomy and thereafter making use thereof are provided. According to one embodiment, a list of base taxonomy elements is displayed on a display device. A taxonomy map is also displayed on the display device. The taxonomy map includes information regarding one or more extended taxonomy elements of a reporting entity that are not mapped to any base taxonomy elements. Responsive to one or more user input events corresponding to a selection of a base taxonomy element and corresponding to a request to map an extended taxonomy element to the selected base taxonomy element, the compatibility of the selected base taxonomy element with the extended taxonomy element is validated. If the compatibility is affirmed, then an association is formed between the extended taxonomy element and the selected base taxonomy element.

39 Claims, 11 Drawing Sheets

TAXONOMY MAPPING

This application is a divisional of U.S patent application Ser. No. 11/848,177, now U.S Pat. No. 7,822,769, filed on Aug. 30, 2007, which claims the benefit of priority of U.S Provisional Application No. 60/824,280, filed on Aug. 31, 2006, both of which are hereby incorporated by reference in their entirety for all purposes.

This application is related to U.S. patent application Ser. No. 11/163,965, now U.S. Pat. No. 7,415,482, and U.S. patent application Ser. No. 11/688,857, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2006-2010 Rivet Software, Inc.

BACKGROUND

1. Field

Embodiments of the present invention generally relate to business intelligence (BI) systems and financial analysis systems. More specifically, embodiments of the present invention provide for Extensible Business Reporting Language (XBRL) taxonomy mapping (i.e., mapping extension taxonomy elements to a standard base taxonomy to achieve consistency and comparability in a diverse reporting environment).

2. Description of Related Art

The XBRL standard provides a framework to categorize information, but also provides a great deal of flexibility for XBRL user within this framework. The specific rules of how information should be reported are the responsibility of the organization requesting the XBRL documents. For example, the FDIC requires member banks to submit XBRL Instance Documents that use the FDIC taxonomy, but banks also must follow specific rules in presenting information within instance documents.

The SEC takes a completely different approach than the FDIC. Since XBRL documents are to be consumed not just by the SEC, but also the investing public, the SEC (at least for now) gives filing companies a great deal of latitude to present information in such a way that best describes the unique characteristics of each company. Although the SEC does require filing companies to use a standard taxonomy—such as US Generally Accepted Accounting Principles for Commercial and Industrial companies (US GAAP CI)—they also allow those companies to create an extension taxonomy which has information not contained in the base taxonomy. An extension may contain completely new elements, or simply a different presentation than the base taxonomy. For example, an XBRL taxonomy may specify that an account called "Cash" appear higher in a Balance Sheet than an account called "Investments"; a filing company may want to reverse this presentation, and to do so would require an extended taxonomy. In addition, some XBRL tagging software products actually encourage filers to create large groups of elements outside of the base taxonomy—even when there is very little difference between the extended elements and base taxonomy.

Although extension taxonomies give companies an effective way to present information in a totally customized way, this flexibility makes comparisons between companies extremely difficult. And comparisons are crucial to regulators, investors, and other consumers of XBRL data, since comparing a company's financial results to industry groups, or to trends, averages, indexes, and various mathematical and statistical formulas, is the most fundamental way to evaluate a company's performance and value. One of the key issues decision makers in corporations face today is finding out how the business is doing, planning for the future, measuring performance against plan, being able to determine when and how a plan might need to be changed in response to internal and external events and ensuring that the organization meets regulatory requirements. This requires that reports and other financial applications are able to work with data from more than one system and the systems of more than one sub-entity (division, country office, etc.).

SUMMARY

Systems and methods are described for mapping extension taxonomy elements to a standard base taxonomy and thereafter making use thereof. According to one embodiment, an intelligent financial and business information reporting application includes methods to allow the results of many companies to be more efficiently compared by regulators, investors, and other consumers of XBRL data. A list of base taxonomy elements is displayed on a display device. A taxonomy map is displayed on the display device. The taxonomy map includes information regarding one or more extended taxonomy elements of a reporting entity that are not mapped to any base taxonomy elements. Responsive to one or more user input events corresponding to a selection of a base taxonomy element and corresponding to a request to map an extended taxonomy element to the selected base taxonomy element, the compatibility of the selected base taxonomy element with the extended taxonomy element is validated. If the compatibility is affirmed, then an association is formed between the extended taxonomy element and the selected base taxonomy element.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
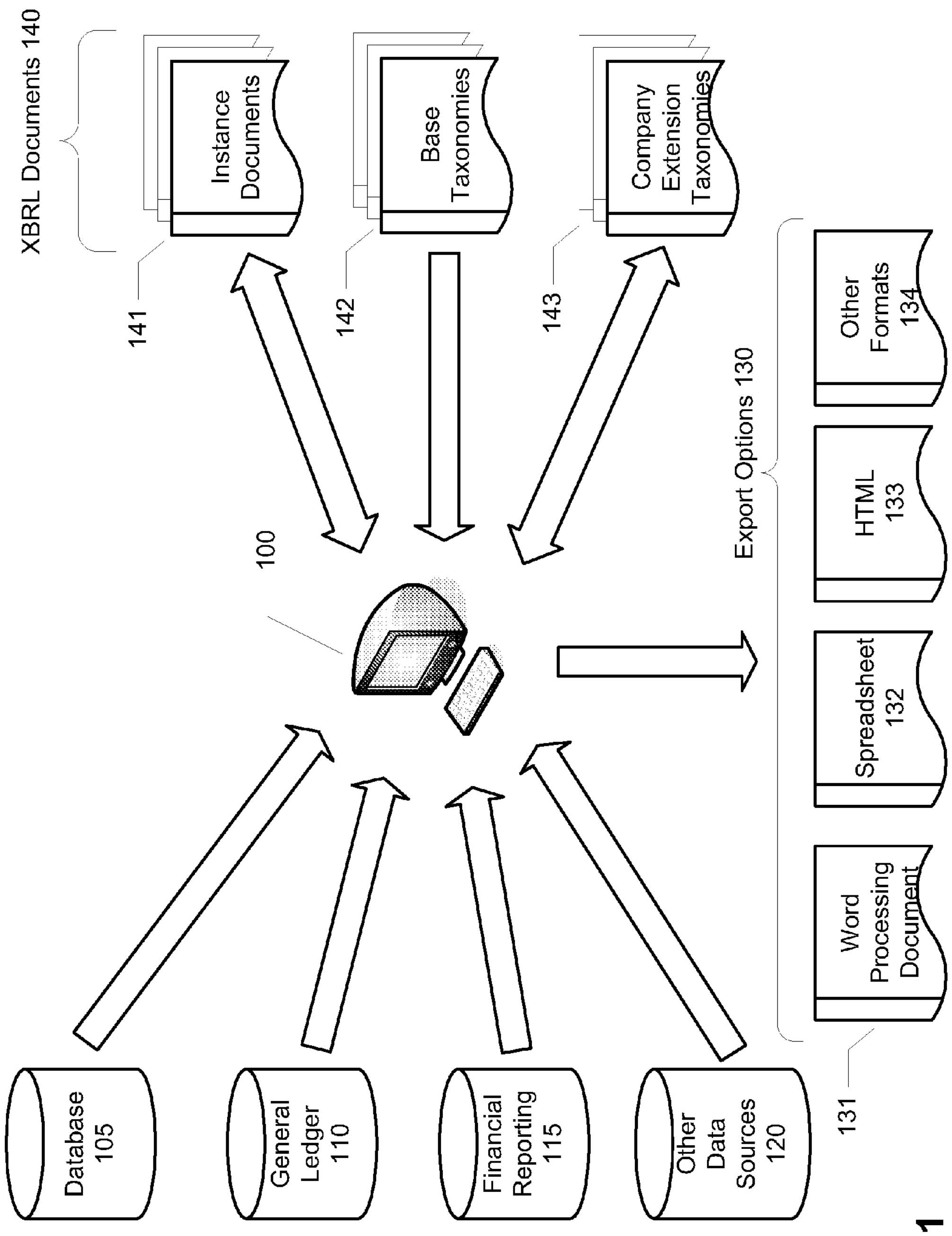
FIG. 1 conceptually illustrates a computer environment in which embodiments of the present invention may be employed.

Systems and methods are described for mapping extension taxonomy elements to a standard base taxonomy and thereafter making use thereof. According to one embodiment an intelligent financial and business information reporting application includes methods to allow the results of multiple companies, each of which may be represented in differing taxonomies and presented in a customized fashion, to be compared among each other, to industry groups, to trends, averages, indexes, and/or various mathematical and statistical formulas, thereby facilitating evaluation of a company's performance and value. Embodiments of the present invention support Extensible Business Reporting Language (XBRL) taxonomy mapping (i.e., mapping extension taxonomy elements to a standard base taxonomy to achieve consistency and comparability in a diverse reporting environment).

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. The machine-readable storage medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, various embodiments of the present invention may be described with reference to a business document production application, such as Microsoft Office Excel, the present invention is equally applicable to various other spreadsheet applications, web-based or online spreadsheets, including, but not limited to, Kyplot, Origin, Quantrix Modeler, Lotus Improv, Ability Spreadsheet, Excel-Explorer, GS-Calc, Mariner Calc, Softmaker Office Planmaker, Spread32, SygmaPlot, The Cruncher, Calc Open, KDCalc, ExcelLite, SpreadsheetGear, 602 Office Tab, Ability Office, Applixware Spreadsheets, AppleWorks, Ashampoo Office PlanMaker, Corel WordPerfect Office Quattro Pro, EasyOffice EasySpreadsheet, Evermore Integrated Office Spreadsheet, Framework, Gobe Spreadsheet, Lotus SmartSuiteLotus 123, Microsoft Works Spreadsheet, Softmaker Office PlanMaker, Open Office Calc, StarOffice Calc, Techdigm Office Calc, Thinkfree Office Spreadsheet, Xoom Office Spreadsheet, JotSpot Tracker, iRows.com, Numsum, ComplyXL, FlyCalc, i-spreadsheet, QuickBase, SecureSheet, Thinkfree, Online Spreadsheet and the like. Additionally, embodiments of the present invention are applicable to other types of productivity tools or programs designed to perform general computational tasks or organizational tasks in relation to underlying data, including word processing applications, such as Microsoft Word and the like and database applications or database management systems, such as 4D, Adabas, Corel Paradox, IBM DB2, FileMaker Pro, FirebirdSQL, IMS, Informix, Ingres, Microsoft Access, Microsoft SQL Server, MySQL, OOo Base, Oracle, PostgreSQL, SQLite, Sybase ASE and the like.

Additionally, while embodiments of the present invention are described with reference to XBRL, it is specifically contemplated that the methods described herein will be applicable to (i) other current and future XBRL-like standards for managing, reporting and/or storing business or analytic data; and/or (ii) other forms of interactive data.

For the sake of illustration, various embodiments of the present invention are described herein in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary.

Terminology

Brief definitions of terms, abbreviations, and phrases used throughout this application are given below.

The phrase "base taxonomy" generally refers to a standard XBRL taxonomy (e.g., US Generally Accepted Accounting Principles for Commercial and Industrial companies (US GAAP CI)) comprised of attributes and/or elements for data that is commonly incorporated into business documents. For example, a base taxonomy may include a net profits attribute or element that is identified by the tag or label "net profit" and that, when associated with a location in a business document, indicates that any data present in that location is defined to be data that reflects a net profit.

The terms "connected" or "coupled" and related terms are used in an operational sense and are not necessarily limited to a direct physical connection or coupling. Thus, for example, two devices may be couple directly, or via one or more intermediary media or devices. As another example, devices may be coupled in such a way that information can be passed there between, while not sharing any physical connection on with another. Based on the disclosure provided herein, one of ordinary skill in the art will appreciate a variety of ways in which connection or coupling exists in accordance with the aforementioned definition.

The phrase "extension taxonomy" generally refers to an XBRL taxonomy which has information not contained in a base taxonomy. An extension taxonomy may contain completely new elements, or simply reflect a different presentation than a base taxonomy. For example, a base taxonomy may specify that an account called "Cash" appear higher in a Balance Sheet than an account called "Investments"; a filing company may want to reverse this presentation, and to do so would require an extended taxonomy.

The term "folio" generally refers to a collection of objects including one or more spreadsheets, metadata elements, hierarchies, and/or various other objects and properties that support enterprise reporting and analysis functionality. According to one embodiment, once a folio is created, reports and analysis can be published and distributed from the folio.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The phrase "reporting entity" generally refers to a business entity having reporting obligations to an oversight or regulatory agency. Examples of reporting entities include publicly traded companies and banks. Examples of oversight or regulatory agencies include the Federal Deposit Insurance Corporation (FDIC) and the Securities and Exchange Commission (SEC).

The term "responsive" includes completely or partially responsive.

FIG. 1 conceptually illustrates a computer environment in which embodiments of the present invention may be employed. According the current example, a computer program running on computer 100 manages operations associated with mapping extended taxonomy elements to base taxonomy elements, resolving queries based on such mapping and/or combining information from multiple data sources (e.g., general ledger (GL) and financial reporting (FR) data) to create XBRL instance documents. The computer program, portions of which may be provided as a web service, may at times be referred to as a reporting/analysis application an intelligent financial and business information reporting application and the like.

The computing environment depicted in FIG. 1 includes a computer 100 that includes one or more processors that are capable of running or executing a business document production application that allows embedding of the reporting/analysis application such that when the business document production application is being executed by the one or more processors reporting/analysis application is also executed by the one or more processors. Typically, the business document production application and the reporting/analysis application are each stored in a memory associated with the computer 100, such as a hard drive that resides in or is otherwise associated with the computer 100 as a peripheral device or via a computer network, such as a wide area network (WAN), local area network (LAN) or a public network, such as the Internet. The computer 100 may further include a monitor that provides visual information to the user during execution of the business document production application and the reporting/analysis application. As described further below, the computer 100 may also include a keyboard, a mouse or other user input devices that allow the user to provide input to the reporting/analysis application.

With continuing reference to FIG. 1, when the computer 100 is executing the business document production application with the embedded or remotely accessible reporting/analysis application, the business document production application is capable of being used to generate business documents, process business documents that were previously produced using the reporting/analysis application and then saved, or produced by another instance of the reporting/analysis application or a compatible application and imported into the reporting/analysis application.

In various of the illustrated embodiments, the business document production application is a Microsoft® Office application, such as Word or Excel, that allows the embedding of the reporting/analysis application via an event handler or similar structure. It should, however, be appreciated that reporting/analysis application is capable of being adapted to be embedded in other business document production applications that provide the capability to embed the program.

A business document that is processed by the business document production application typically incorporates data from one or more data sources, such as database 105, general ledger data 110, financial reporting data 115 and other data sources 120. In addition, the user of the computer 100 may provide data that is incorporated into the document via the keyboard or other input peripheral. In any event, the business document production application is capable of being used to produce a document that incorporates business data. The reporting/analysis application interacting with the business document production application is capable of being used to produce XBRL documents, such as XBRL instance documents 141 and entity (typically, a company) extension taxonomies 143. The reporting/analysis application may also export data to other usable formats, such as a word processing document 131, a spreadsheet 132, an HTML document 133 and/or other formats 134.

As described further below, according to one embodiment, an XBRL instance document translation may also be performed by the reporting/analysis application, thereby allowing instance documents 141 to serve as a data source for generation of reports and other instance documents 141. In some embodiments, the translation application operates to translate an XBRL instance document into a format that, when displayed, is more readily appreciated by users that are unfamiliar with XML/XBRL programming language and do not have the time or inclination to become familiar with the XML/XBRL programming language. In this regard, the translation application is capable of translating an XBRL instance document into any number of formats, including Microsoft Excel and Word formats.

Figure 2:
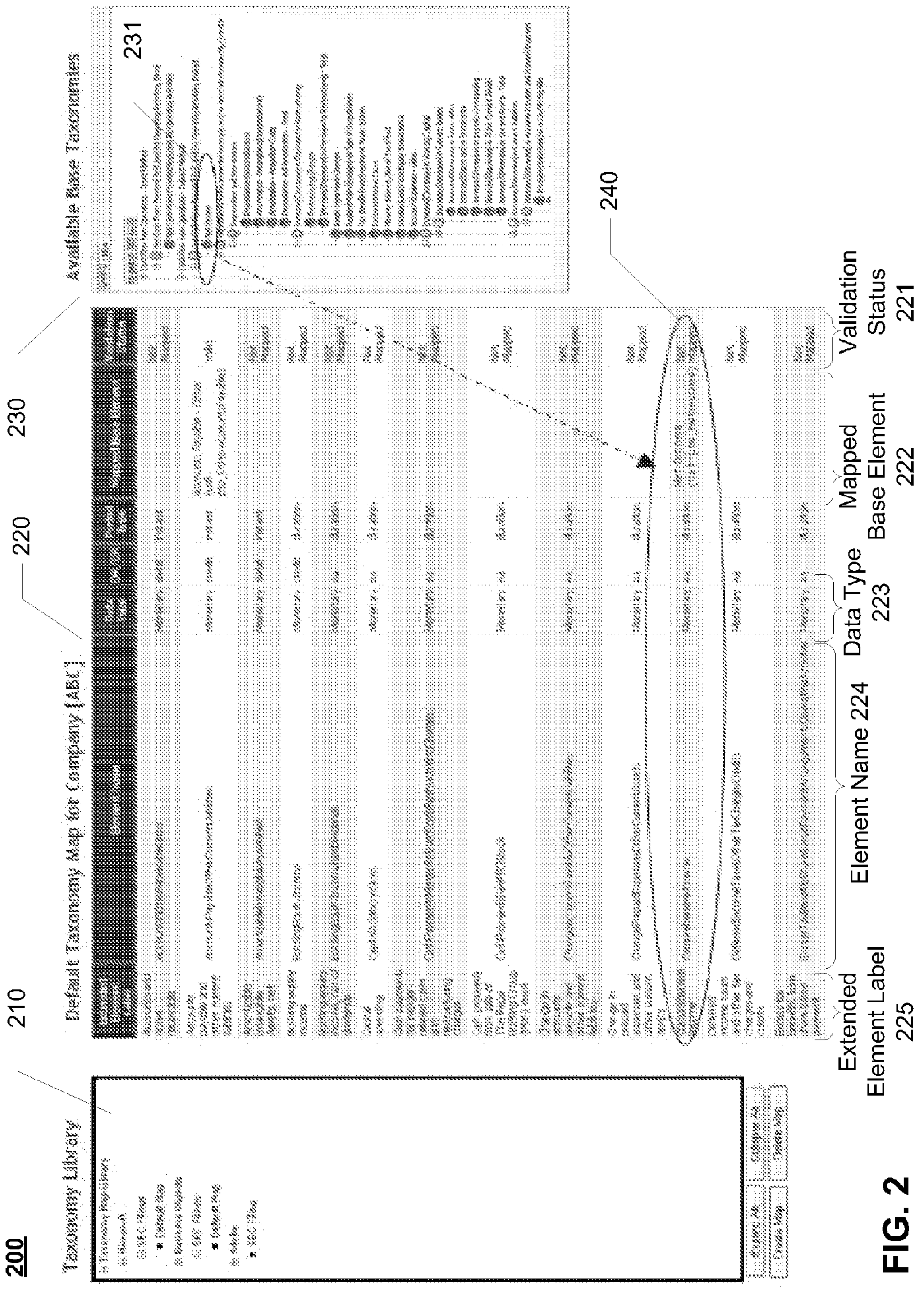
FIG. 2 illustrates exemplary user interface components that may be employed in accordance with various embodiments of the present invention may be employed.

FIG. 2 illustrates exemplary user interface components that may be employed in accordance with various embodiments of the present invention may be employed. According to the current example, a user interface 200 includes a collapsible/expandable taxonomy library 210, a taxonomy map 220 and a collapsible/expandable list of available base taxonomies 230. The user interface 200 may be implemented as web-based mapping user interface (e.g., displayed within a browser) or as a graphical user interface supported by Windows or another operating system.

According to the current example, the taxonomy library 210 organizes taxonomy maps by company/source. The list of available base taxonomies 230 may be a window with a hierarchical display of taxonomy elements containing the base taxonomy.

The taxonomy map 200 represents a list of extended taxonomy elements for a particular company, where for each extended taxonomy element (row), fields include, an extended element label 225, an element name 224, a data type 223, identification of a mapped base element 222 and information regarding a validation status 221. The mapped base element field 222 identifies a base taxonomy element in the list of available base taxonomies to which the extended taxonomy element is mapped. Typically, this field will be blank if there is no current mapping for the extended taxonomy element and the corresponding validation status field 221 will indicate "Not Mapped." After the user has requested an extended taxonomy element to be mapped to one or more base taxonomy elements and the mapping has been validated, the validation status field 221 will indicate "Valid" and the mapped base element field 222 will contain information regarding the one or more base taxonomy elements to which the extended taxonomy element is mapped.

According to one embodiment, the taxonomy map 200 may initially display all extended taxonomy elements for a particular company. Alternatively, the taxonomy map 200 may be sorted by a particular column of the taxonomy map 200 or limited to certain values for a particular column (e.g., unmapped extended taxonomy elements).

The taxonomy map 200 may be modified by the user making a mapping request. In one embodiment, a mapping request may be represented by selecting a base taxonomy element (e.g., a net income base taxonomy element 231) from the list of available base taxonomies, selecting the extended taxonomy element that is to be mapped to the selected base taxonomy element and then communicating the desire to form a mapping between the two selected taxonomy elements by way of a key sequence, a pop-up window or other mechanism. Alternatively, the act of dragging a base taxonomy element and dropping it onto an extended taxonomy element may represent a mapping request. Those skilled in the art will appreciate there are numerous ways of selecting objects within a graphical user interface and issuing commands related thereto. For example, in one embodiment, the UI 200 allows a user to highlight several extended taxonomy elements from the taxonomy map 220 (contiguous or not) and then select the same number of elements from the base taxonomy list 230. All the elements thus selected are mapped (e.g., from top to bottom of the lists). An error message may be displayed if the number of selections doesn't match. As discussed further below, validation rules may be applied on-the-fly to ensure the validity of the mapping and error messages may be displayed if not all validation rules pass.

In the present example, the user has dragged and dropped the net income base taxonomy element 231 onto the extended taxonomy element 240. As a result, the name of the base taxonomy element, "Net Income," has appeared in the mapped base element field 222. After successful validation of the requested mapping, the validation status field 221 will change to "Valid." If the validation of the requested mapping is unsuccessful, then the validation status field 221 will remain "Not Mapped," and a dialog box or pop up screen may identify the reason for the mapping failure (e.g., incompatible data types, incompatible period types, etc.).

Figure 3:
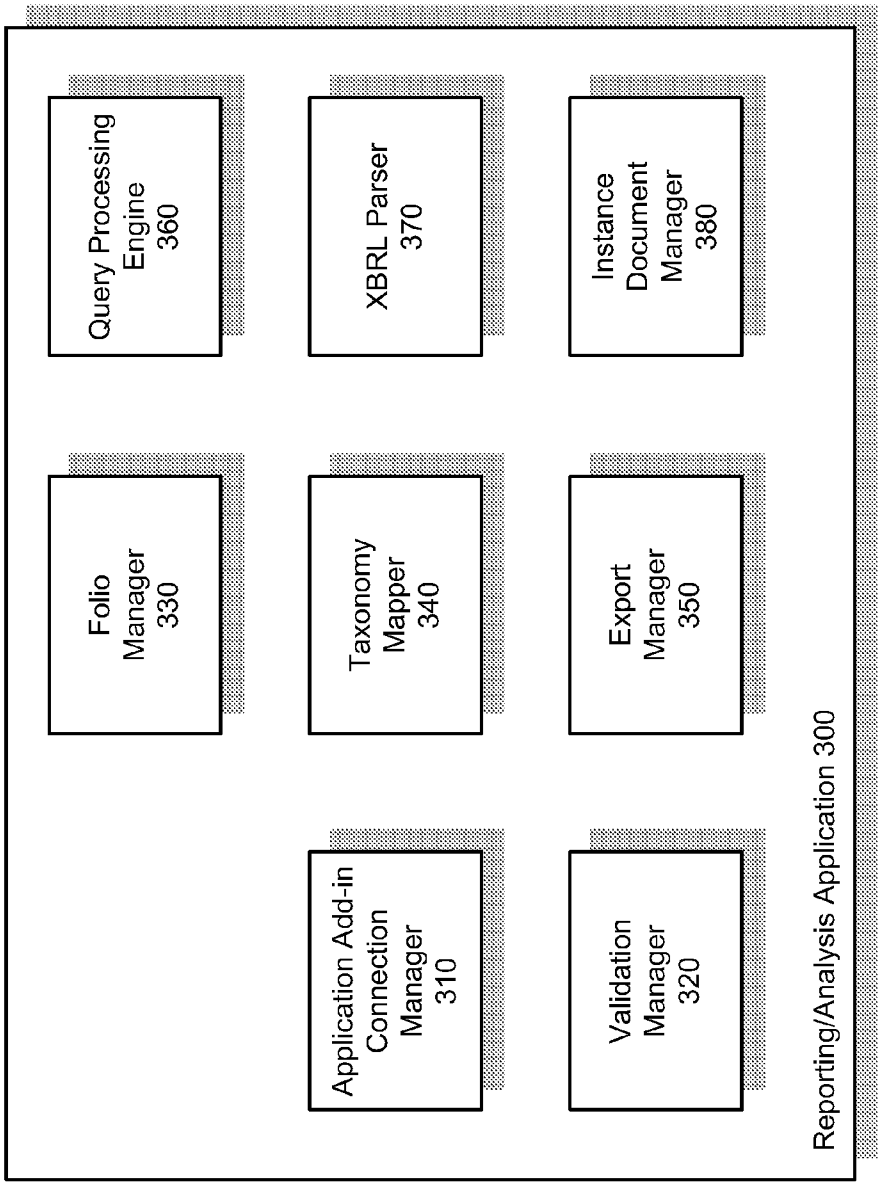
FIG. 3 illustrates exemplary functional units that may exist within a reporting/analysis application in accordance with various embodiments of the present invention may be employed.

FIG. 3 illustrates exemplary functional units that may exist within a reporting/analysis application 300 in accordance with various embodiments of the present invention may be employed. In the current example, the reporting/analysis application 300 includes an application add-in connection manager 310, a validation manager 320, a folio manager 330 a taxonomy mapper 340, an export manager 350 a query processing engine 360, an XBRL parser 370 and an instance document manager 380.

In some embodiments, add-in connection manager 310 may implement the interface between the business document production application and the reporting/analysis application 300. For example, the add-in connection manager 310 may be adapted to communicate with an operating system event handler, an application program interface utility that manages communications between the add-in connection manager 310 and the business document production application (e.g., Microsoft Word or Microsoft Excel). It should be appreciated that the add-in connection manager 310 may be implemented to communicate with other business document production applications that support embedding via a utility that achieves the same function as the event handler.

In operation, the add-in connection manager 310 and the event handler typically cooperate such that when the business document production application is executed or run by one or more processors of the computer (e.g., computer 100), the reporting/analysis application 300 is available for use within the business document production application. In some embodiments, the reporting/analysis application 300 is accessed responsive to user selection of an icon for the reporting/analysis application 300 that is established in the business document production application. In other embodiments, certain data interactions or key sequences within the business document production application (e.g., double clicking a value associated with a taxonomy element) may cause the reporting/analysis application 300 to be accessed to perform certain functionality (e.g., drilldown). Once the manager 30 is accessed, a windows-style interface may be established on the monitor of the computer system that allows the user to interact with the other features or utilities associated with the reporting/analysis application 300. It should be appreciated that access to the reporting/analysis application 300 can be provided in many other ways, such as by the user typing in an appropriate command.

It should also be appreciated that the function of the add-in connection manager 310 can take other forms in embodiments of the invention in which the reporting/analysis application 300 is native or co-resident with the business document production application or in which one or both of the reporting/analysis application 300 and the business document production application are hosted remotely or otherwise accessed via a Software as a Service (SaaS) model.

Taxonomy mapper 340 operates to provide an interface to the monitor that allows the user to create extended taxonomies and form associations between elements of extended taxonomies and elements of base taxonomies. According to one embodiment of the present invention, taxonomy mapper 340 provides the ability for a filing company (or anyone else) to define how the elements in an extension taxonomy best map to a base taxonomy. Notably, there may not be an exact match between extension and base elements (thus, the use of an extension in the first place), so a map typically identifies the closest element in the base taxonomy. For example, as illustrated with reference to FIG. 2, a user may create a mapping between an extended element labeled "Comprehensive Income" and an element of the base taxonomy (e.g., "Net Income") that is most closely related to the extended element.

The taxonomy mapper 340 operates so as to provide a user interface to create, edit, and store one or more maps for a filing company. Depending upon the particular implementation, the taxonomy mapper 340 may also provide the ability to create supplemental maps that extend an existing map for changes to a later version of an extension taxonomy. The taxonomy mapper 340 also provides the ability to allow an appropriately configured reporting/analysis application (e.g., CROSSFIRE and DRAGON VIEW available from Rivet Software, Inc. of Englewood, Colo.) to utilize maps to create and analyze information using only base taxonomies. In some embodiments, taxonomy mapper 340 provides the ability to store a default map name to be used for each entity, as well as functionality to specify a map at the row, column or folio level.

Validation manager 320 applies validation rules to ensure the validity of the requested mapping. Error messages may be displayed if not all validation rules pass. According to one embodiment the validation rule applied include at least ensuring the data types and period types of the base taxonomy element(s) and the extended taxonomy element(s) are compatible.

Folio manager 330 handles events associated with and user interactions with folios. For example, folio manager 330 recognizes drilldown requests and submits corresponding queries to query processing engine 360 and imports and aggregates data associated with elements dropped on the folio.

Export manager 350 processes business documents to: (a) produce an XBRL instance document that conforms to the XBRL Specification or standard, which as such, is capable of being processed by other XBRL applications that also conform to the specification or standard, (b) transmit the XBRL instance document to a recipient, and/or (c) convert the business document to another supported format. Operation of the export manager 350 is typically initiated via the windows-style interface that is produced on the monitor after the user accesses the reporting/analysis application 300. Generally, the export manager 350 operates so as to identify the marked up data in the document of interest, format the marked up data according to the XBRL specification, serialize the formatted data to create the XBRL instance document, and cause the XBRL instance document to be transmitted to a recipient. It should be noted that, due to the integrated nature of the reporting/analysis application 300, in accordance with various embodiments of the present invention, the user is able to use the export manager 350 to produce XBRL instance documents and export such documents during the same session that the user employs other features of the business document production application and/or the reporting/analysis application 300.

Query processing engine 360 resolves queries received from other functional units that may include taxonomy elements. As described further below, when a query specifies a base taxonomy element that is mapped to one or more extended taxonomy elements, the query processing engine 360 will actually try to resolve the query by adding the one or more extended taxonomy elements.

With the assistance of XBRL parser 370, instance document manager 380 reads/parses XBRL instance documents, such as those requested to be translated by the user. According to one embodiment XBRL parser 370 is operative to: (a) generate or create a taxonomy that is available to the user or (b) both create a taxonomy and generate an XBRL instance document based on the taxonomy. The XBRL parser 370 may be used by taxonomy mapper 340, instance document manager 380 and export manager 350 in performing their respective functions. For example, after the relevant taxonomy or taxonomies have been loaded and the relevant instance document read, export manager 350 may use the relevant taxonomy or taxonomies and the instance document to generate an export document that is in Excel, Word, HTML, or some other format that is readily comprehensible to most all individuals regardless of their familiarity with the XML/XBRL programming languages.

In one embodiment, the functionality of one or more of the above-referenced functional units may be further subdivided and/or merged in various combinations. For example, validation manager 320 may be incorporated within taxonomy mapper 340 and XBRL parser 370 may be incorporated within instance document manager 380. Moreover, the functional units can be communicatively coupled using any suitable communication method (e.g., message passing, parameter passing, and/or signals through one or more communication paths etc.). Additionally, the functional units can be logically and/or physically connected according to any suitable interconnection architecture (e.g., fully connected, hypercube, etc.).

According to embodiments of the invention, the functional units can be any suitable type of logic (e.g., digital logic, software code modules, etc.) for executing the operations described herein. Any of the functional units used in conjunction with embodiments of the invention can include machine-readable storage media having tangibly embodied therein instructions for performing various operations described herein.

Figure 4:
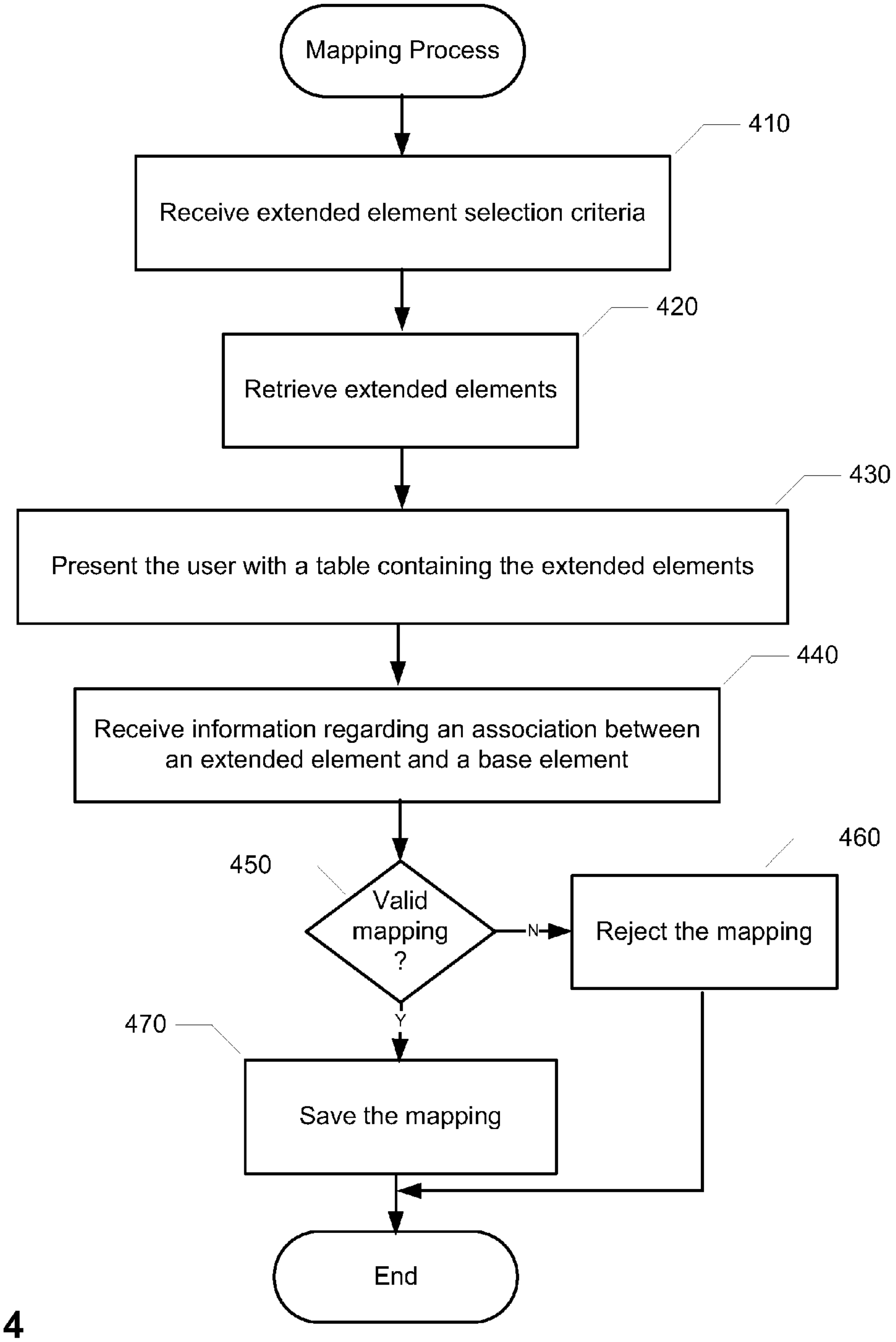
FIG. 4 is a flow diagram illustrating a mapping process in accordance with various embodiments of the present invention.

FIG. 4 is a flow diagram illustrating a mapping process in accordance with various embodiments of the present invention. In one embodiment, as illustrated with reference to FIG. 2, a UI of a reporting/analysis application may create a window with a hierarchical display of taxonomy elements containing the base taxonomy. A user may then invoke a mapping process in accordance with various embodiments of the present invention by highlighting an extension element and selecting a corresponding base element from the selector panel, for example.

At block 410, the reporting/analysis application or a functional unit thereof (e.g., taxonomy mapper 340 of the reporting/analysis application 300) receives one or more extended taxonomy element selection criteria as may be selected or otherwise specified by the user. By default, the selection criteria may encompass all extended taxonomy elements for a reporting entity.

At block 420, the reporting/analysis application or a functional unit thereof (e.g., taxonomy mapper 340 of the reporting/analysis application 300) retrieves the selected extended taxonomy elements, which may span multiple company taxonomies.

At block 430, the reporting/analysis application or a functional unit thereof (e.g., taxonomy mapper 340 of the reporting/analysis application 300) presents the user with a table (e.g., taxonomy map 200) containing the selected extended taxonomy elements.

At block 440, the reporting/analysis application or a functional unit thereof (e.g., taxonomy mapper 340 of the reporting/analysis application 300) receives information regarding a desired association between one or more extended taxonomy elements and one or more base taxonomy elements.

At decision block 450, responsive to the mapping request of block 440, the reporting/analysis application or a functional unit thereof (e.g., validation manager 320 of the reporting/analysis application 300) determines whether the mapping request represents a valid mapping. According to one embodiment, element mapping validation rules include (i) a validation rule to ensure the number of selected base taxonomy elements is equal to the number of selected extended taxonomy elements, (ii) a validation rule to determine whether the data types match (e.g., a monetary type account can't be mapped to a string type account) and (iii) a validation rule to determine whether the period types match (e.g., a balance sheet account can't be mapped to an income statement account). If the validation rules all pass, then processing branches to block 470; otherwise processing continues with block 460.

At block 460, one or more of the validation rules have failed. Consequently, the mapping is rejected and an error message may be displayed indicating the reason for the invalidity of the mapping request.

At block 470, all the validation rules passed. So, the mapping is performed and saved.

At this point, one mapping request has been processed. The user may repeat the processing continuing with block 440 as necessary until all remaining unmapped extended taxonomy elements have been mapped, for example.

In some embodiments, an additional feature provided by the taxonomy mapper 340 allows for more sophisticated mappings by adding a conversion formula field. For example, a user may select one extension taxonomy element and multiple base taxonomy elements; therefore, involving a conversion formula to indicate how the amount associated with the one extension taxonomy element is split among the multiple base taxonomy elements.

In one embodiment, a simplifying assumption may result in the formula or relationship between the multiple base taxonomy elements and the extension taxonomy element assuming the base taxonomy elements "=" (is equal to) the extension taxonomy element, where the entire extended taxonomy element is included in the identified base taxonomy element (s). The ultimate use of such a formula, however, is typically to allow a user to either allocate one extended taxonomy element into several base taxonomy elements, or to do some type of sophisticated conversion that may involve other element names (such as base=extended element*CASH/Net Income).

Figure 5:
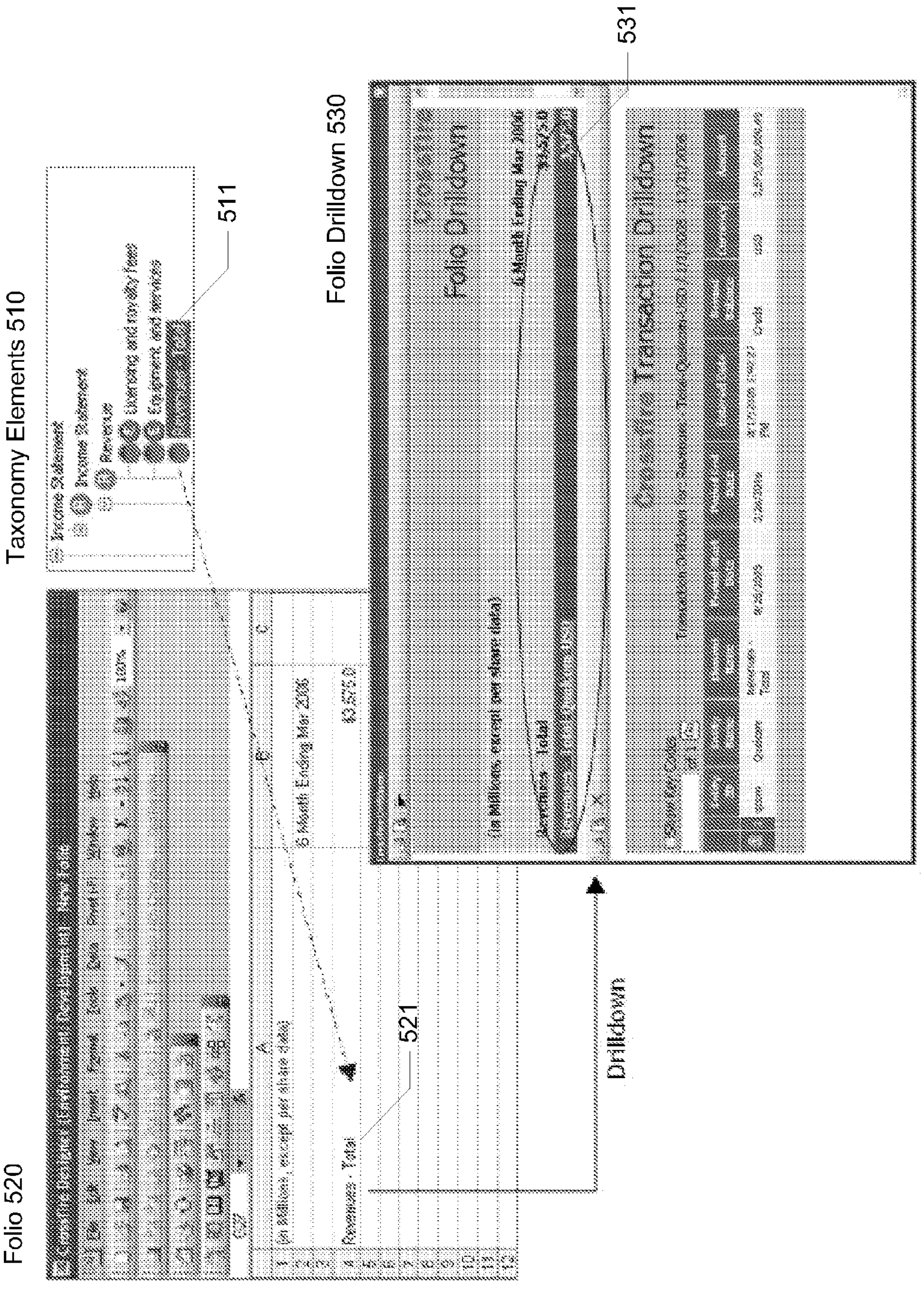
FIG. 5 illustrates the result of a folio drilldown process when the base taxonomy element at issue is not mapped to extended taxonomy elements or the mapping is disabled in accordance with various embodiments of the present invention.

FIG. 5 illustrates the result of a folio drilldown process when the base taxonomy element at issue is not mapped to extended taxonomy elements or the mapping is disabled in accordance with various embodiments of the present invention. According to the current example, a user has dropped a base taxonomy element 511 named "Revenues—Total" from a hierarchical list of taxonomy elements 510 onto a folio 520 to create an aggregated "Revenues—Total" folio object 521. Subsequently, the user has made a drilldown request in relation to folio object 521 resulting in the display of a folio drilldown window containing results 531 of a query relating to the folio object 521.

Again, in this example, it is assumed that the base taxonomy element at issue 511 is either (i) not currently mapped to any extended taxonomy elements or (ii) is currently mapped to one or more extended taxonomy elements, but the mapping has been turned off by the user or is otherwise disabled. Consequently, the result 531 of the drilldown does not provide any further breakout as the element used in the query was identical to the element at issue in the original drilldown request.

Figure 6:
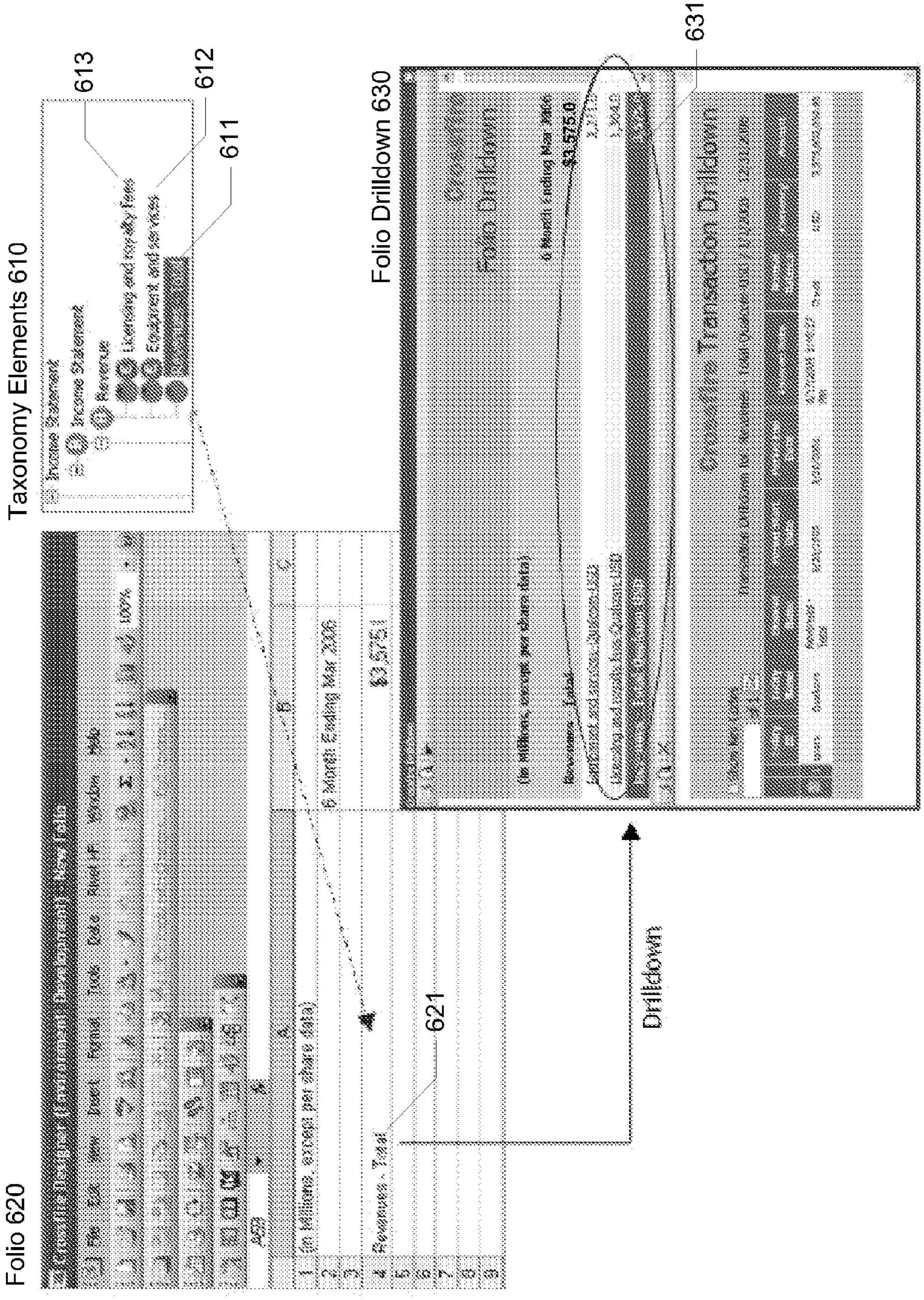
FIG. 6 illustrates the result of a folio drilldown process when the base taxonomy element at issue is mapped to one or more extended taxonomy elements and the mapping is enabled in accordance with various embodiments of the present invention.

FIG. 6 illustrates the result of a folio drilldown process when the base taxonomy element at issue is mapped to one or more extended taxonomy elements and the mapping is enabled in accordance with various embodiments of the present invention. As in the example illustrated with reference to FIG. 5, according to the current example, a user has dropped a base taxonomy element 611 named "Revenues—Total" from a hierarchical list of taxonomy elements 610 onto a folio 620 to create an aggregated "Revenues—Total" folio object 621. Subsequently, the user has made a drilldown request in relation to folio object 621 resulting in the display of a folio drilldown window containing results 631 of a query relating to the folio object 621.

In this example, however, two extended taxonomy elements, named "Licensing and royalty fees" 613 and "Equipment and services" 612, are mapped to the base taxonomy element 611. Consequently, the result 631 of the drilldown includes results for each element that was actually used in the query.

Figure 7:
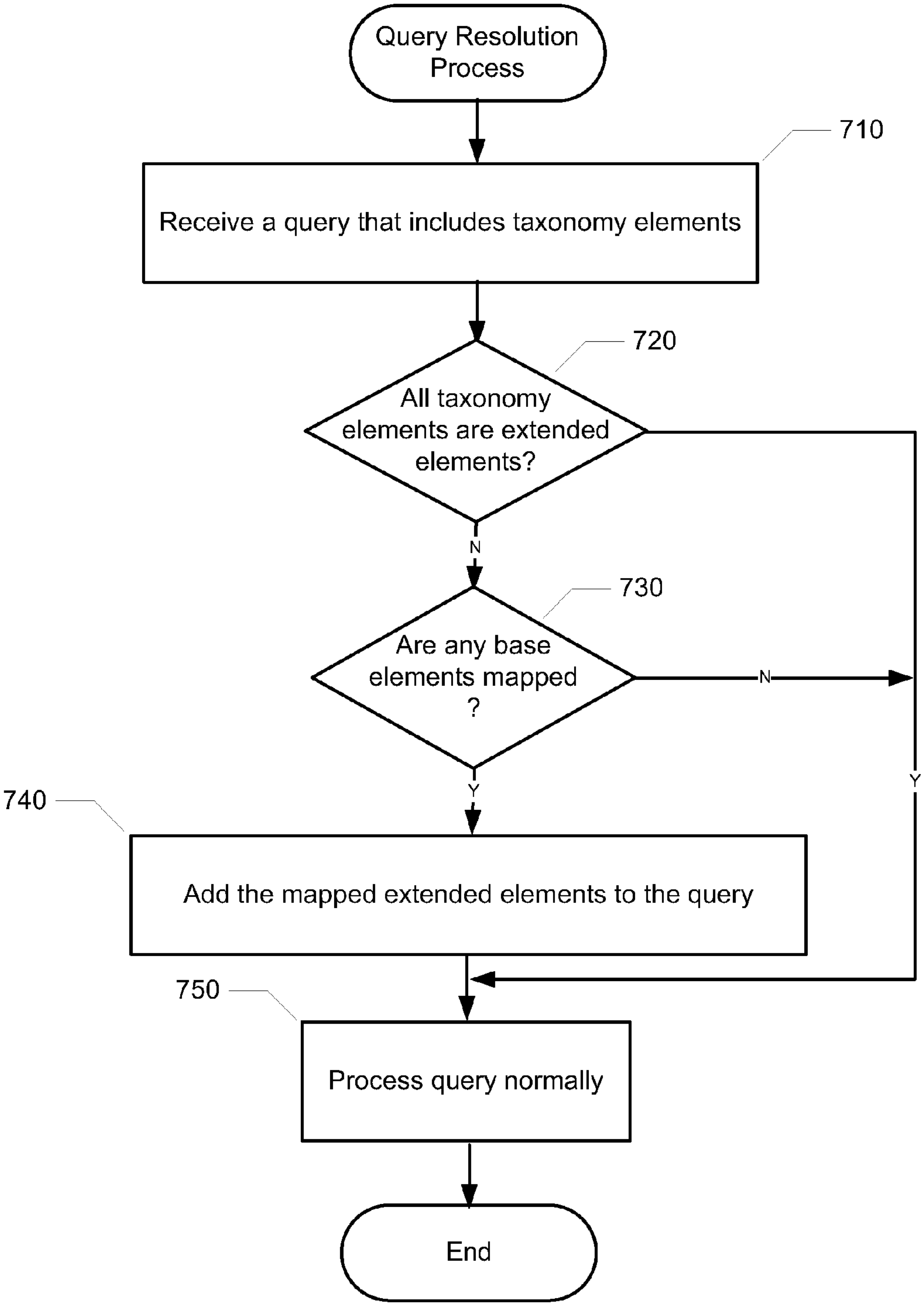
FIG. 7 is a flow diagram illustrating a query resolution process in accordance with various embodiments of the present invention.

FIG. 7 is a flow diagram illustrating a query resolution process in accordance with various embodiments of the present invention. According to the present example (and as illustrated above with reference to FIG. 5 and FIG. 6), if all elements in the query are extended by the filing company (or companies), then the query is processed in the usual manner; however, if any of the base elements can be resolved using the map defined for the filing company (or companies), then the query is supplemented to include the mapped extended elements before the query resolution process is initiated.

At block 710, the reporting/analysis application or a functional unit thereof (e.g., query processing engine 360 of the reporting/analysis application 300) receives a query that includes taxonomy elements.

At decision block 720, the reporting/analysis application or a functional unit thereof (e.g., query processing engine 360 of the reporting/analysis application 300) determines whether all taxonomy elements within the query are extended taxonomy elements. If so, processing branches to block 750; otherwise processing continues with decision block 730.

At decision block 730, it has been determined that one or more taxonomy elements within the query are base taxonomy elements. Consequently, a determination is made regarding whether any of the base taxonomy elements that are part of the query are mapped. If so, then processing continues with block 740; otherwise, processing branches to block 750.

At block 740, it has been determined that one or more taxonomy elements within the query are base taxonomy elements that are mapped to extended taxonomy elements. Consequently, for each of the base taxonomy elements that are mapped, the corresponding extended taxonomy elements are added to the query.

At block 750, either all the taxonomy elements of the original query were extended elements or extended taxonomy elements have now been added to the original query for each of the base taxonomy elements of the original query that are mapped. At this point, the query (as supplemented with any extended taxonomy elements) can be processed in the usual manner.

Figure 8:
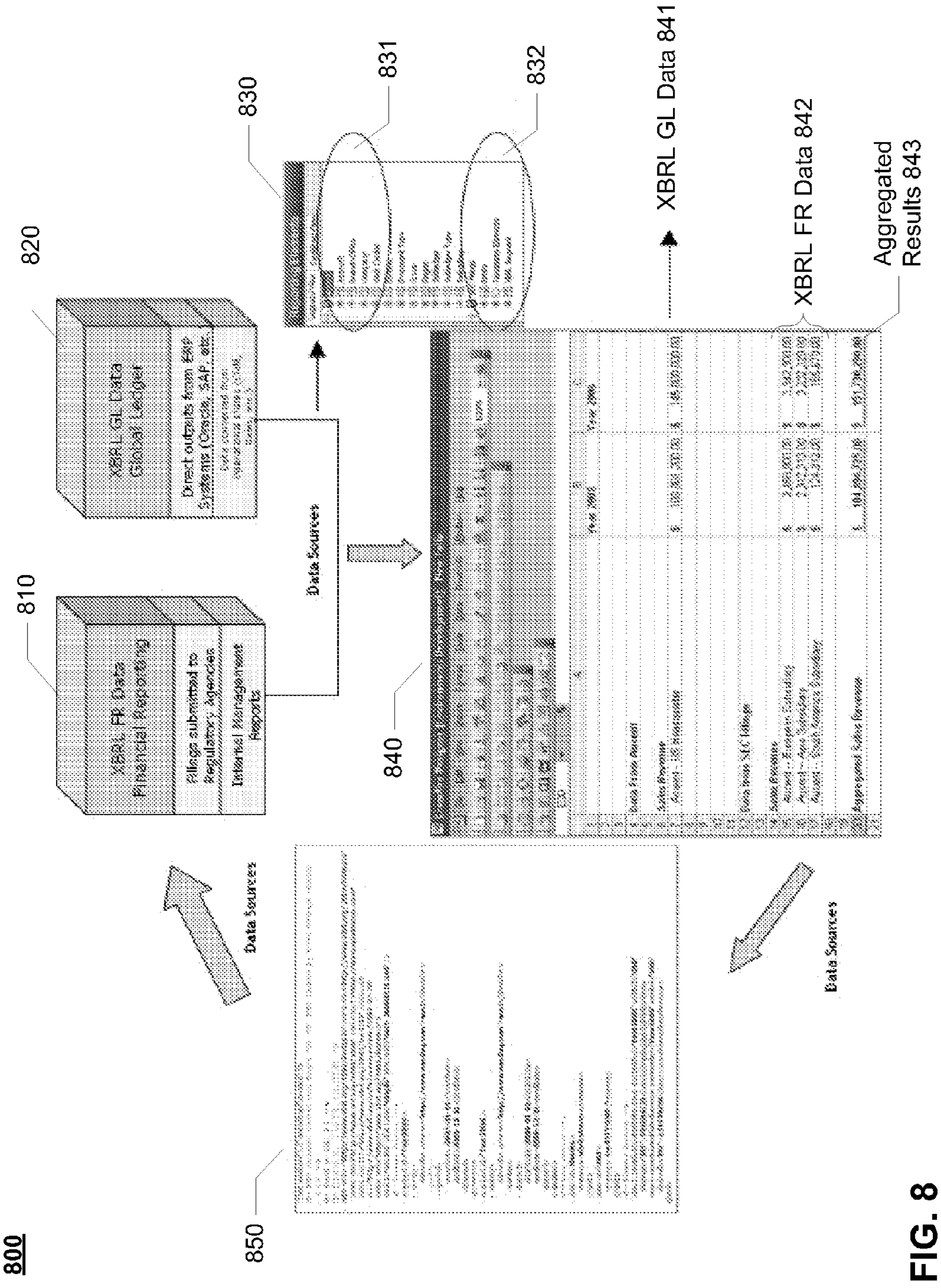
FIG. 8 conceptually illustrates an XBRL data life cycle in accordance with various embodiments of the present invention.

FIG. 8 conceptually illustrates an XBRL data life cycle 800 facilitated by various embodiments of the present invention. XBRL has provided great flexibility in data gathering, but is yet to be used to its full potential. Users of products implementing functionality in accordance with embodiments of the present invention can truly harness the benefits of incorporating XBRL into their reporting cycles. While most reporting tools are limited to getting at transactions through the traditional database data acquisition route, a reporting/analysis application in accordance with an embodiment of the present invention can get data at the level that was available (FR or GL), and in turn output the reporting results back into instance documents 850 for additional reporting and analysis needs.

According to the present example, the XBRL data life cycle 800 includes XBRL financial reporting (FR) data 810, XBRL general ledger (GL) data, a reporting elements selector panel 830, a folio 840 and an XBRL instance document any of which may be the origin or a data source for incorporation of XBRL into a reporting entity's reporting cycle.

XBRL FR data 810 may include filings submitted to regulatory agencies and/or internal management reports. XBRL GL data 820 may include direct outputs from Enterprise Resource Planning (ERP) systems (e.g., Oracle, SAP, etc.) and/or data converted from operational stores (e.g., Customer Relationship Management (CRM), sales, etc.).

Notably, a reporting/analysis application, such as the reporting/analysis application 300, implementing certain functionality described herein provides the ability to obtain data at different levels for incorporation into business documents and/or reports.

For example, in the reporting elements selector panel 830, the reporting/analysis application can display different types of data sources, such as FR level data 832 (data already aggregated for the reporting concepts (for example, net income for Q1 2005, sales revenue for Year 2005, etc.), GL level data 831 (data are in the raw transaction format (for example, sales for widget A on Jan. 1, 2005, travel expense for Robert on Jan. 1, 2005, etc.) and the like, in a single place. Meanwhile, users do not need to know if the data is coming from FR or GL. They can simply drag & drop the business objects from the selector panel to the folio design pane 840 and refresh data. As a result, a folio or report may include both XBRL GL data 841 and XBRL FR data 842 as well as aggregated results 843 contained within a single cell that are based on multiple data sources.

Figure 9:
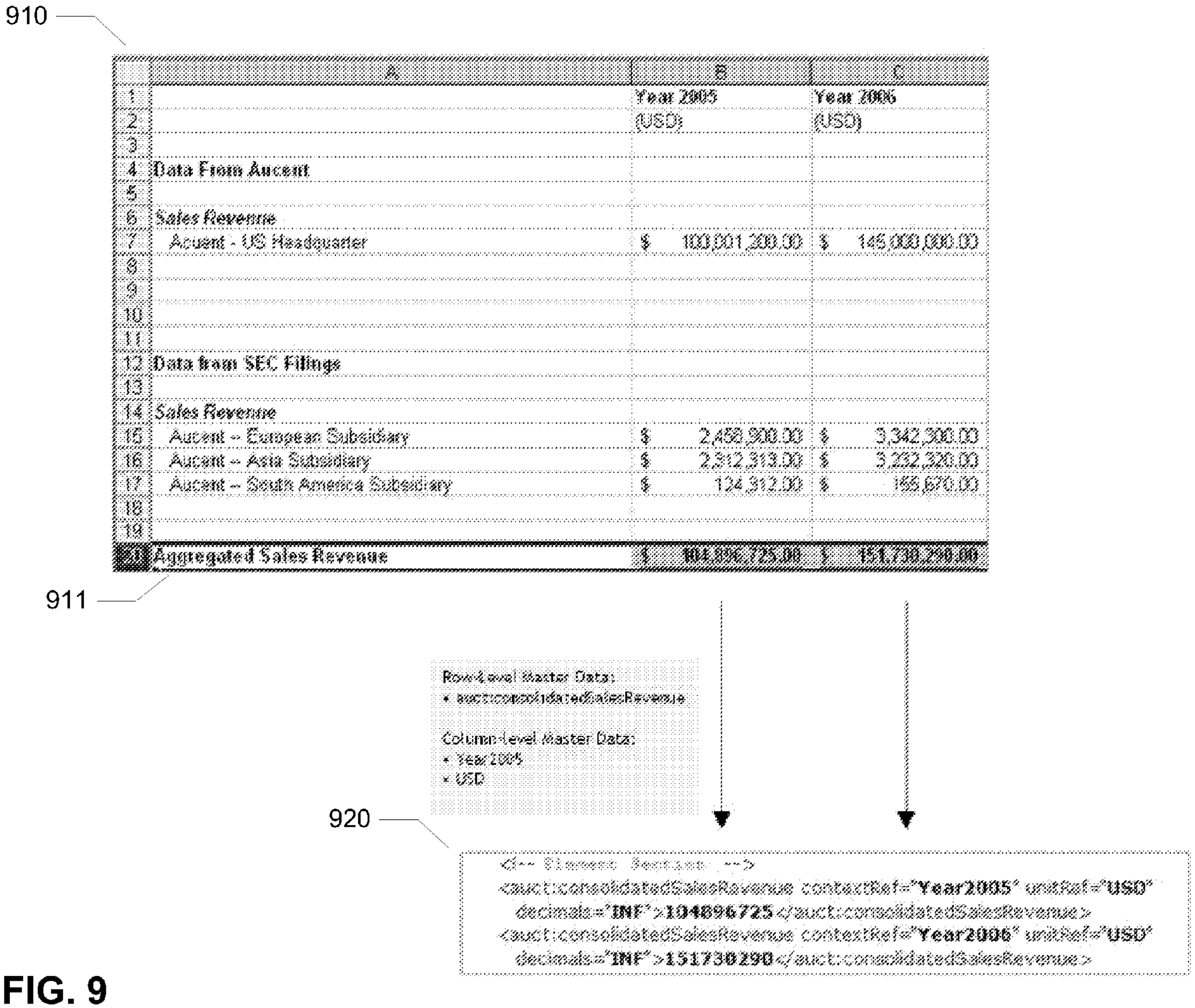
FIG. 9 illustrates how a folio becomes a data source in accordance with various embodiments of the present invention.

FIG. 9 illustrates how a folio 910 becomes a data source in accordance with various embodiments of the present invention. Once reporting results are retrieved from the server, users can "export" the results into an instance document for further processing when necessary.

According to one embodiment, the export is accomplished by "attaching" row-level and column-level master. In the context of the present example, the user simply identifies the XBRL tag as "<auct:consolidatedSalesRevenue>" for row 20. Similarly, for column B, the user may simply identify the XBRL tag as "<Year2005>" for context and "<USD>" as unit. Similarly, column C would be tagged as "<Year2006>" and "<USD>". The actual context and unit references may be exported to a separate section of an instance document as described below with reference to FIG. 10.

Figure 10:
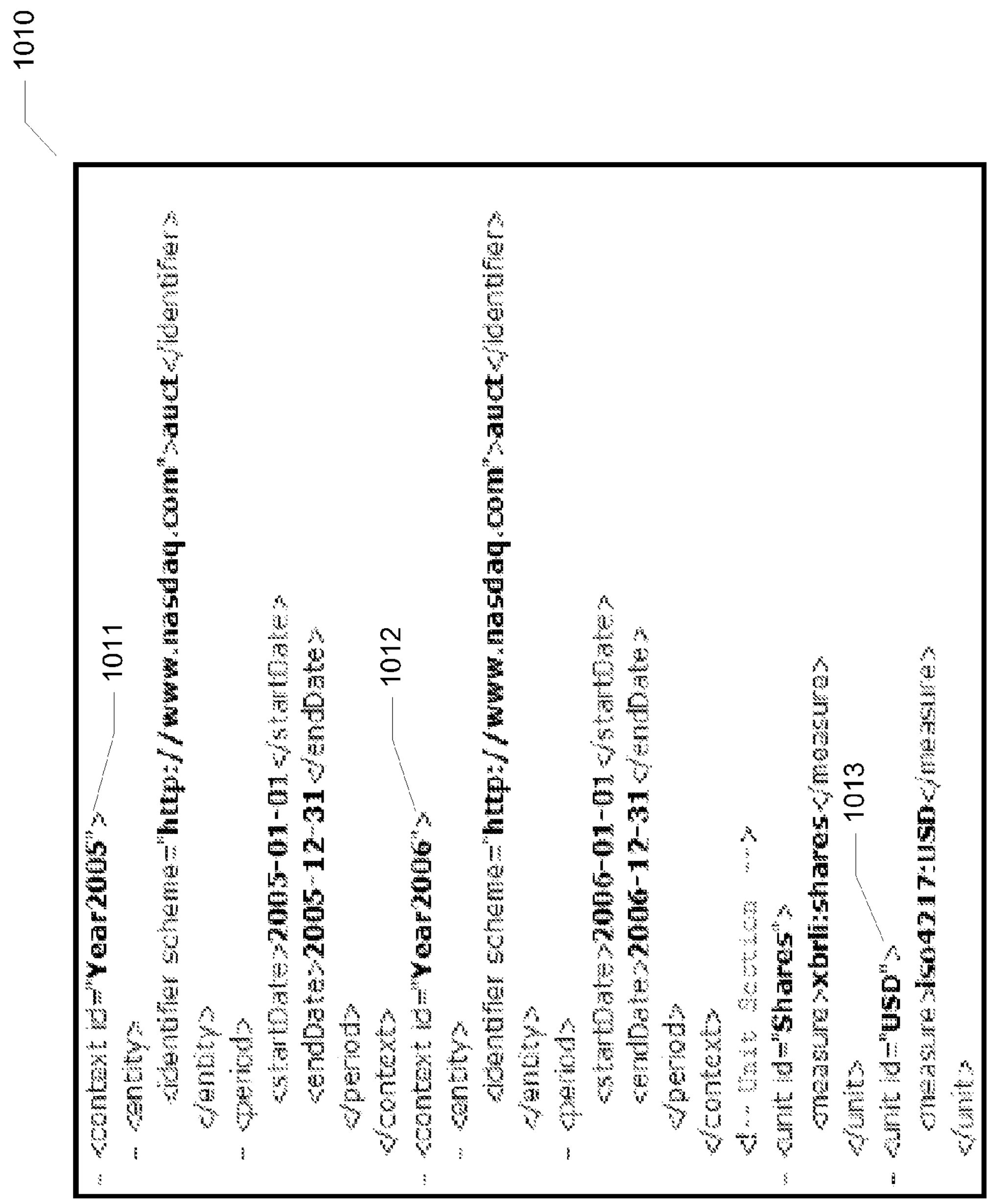
FIG. 10 illustrates a portion of an instance document resulting from export of folio results in accordance with various embodiments of the present invention.

FIG. 10 illustrates a portion of an instance document 1010 resulting from export of folio results in accordance with various embodiments of the present invention. In the current example, the portion of the instance document 1010, illustrate how the simple act of attaching XBRL tags to the section of a folio desired to be can turn that portion of the folio into a data source.

Figure 11:
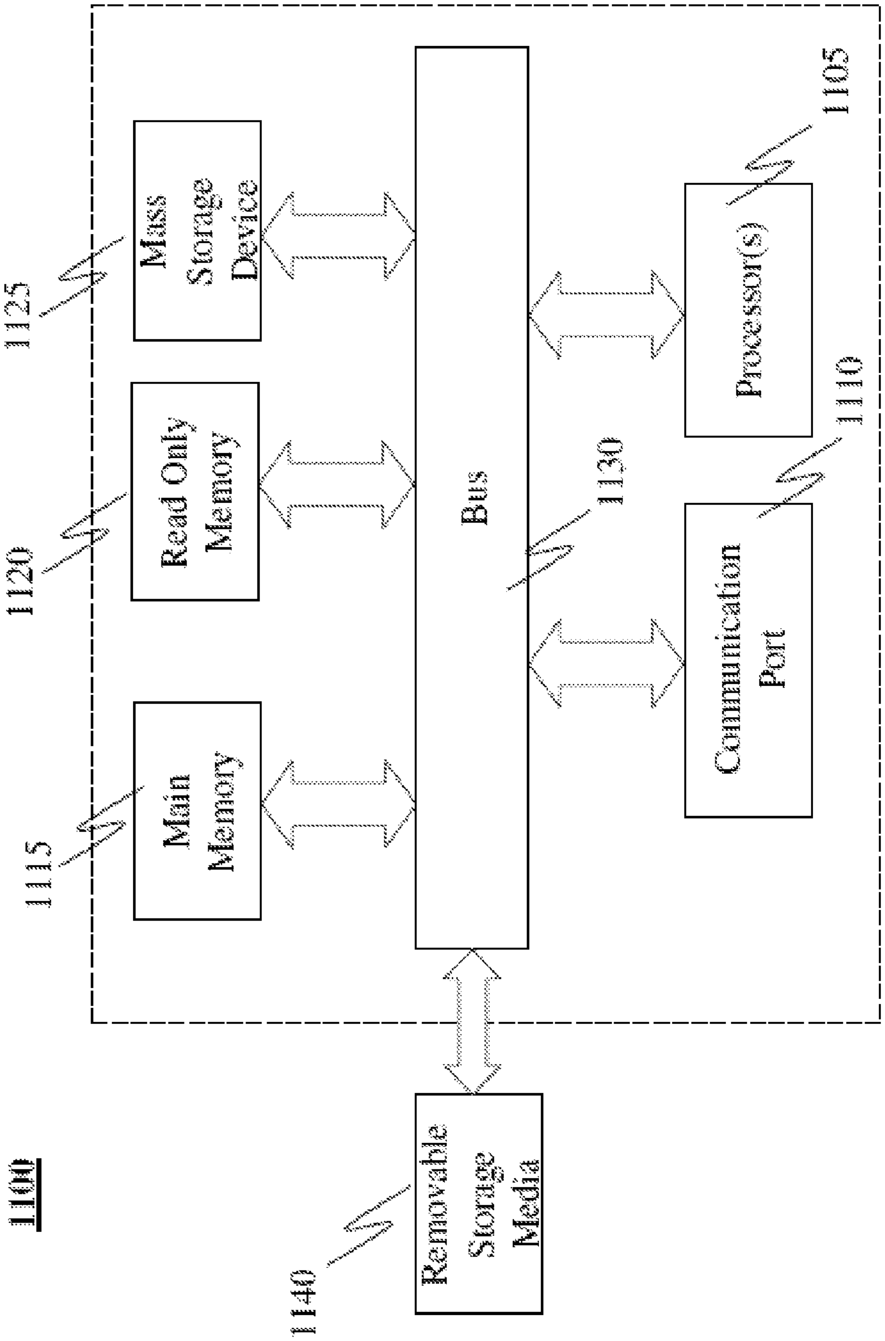
FIG. 11 is an example of a computer system upon which or with which embodiments of the present invention may be utilized.

Embodiments of the present invention include various steps, which have been described above. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 11 is an example of a computer system 1100, such as a workstation, personal computer, client or server, upon which or with which embodiments of the present invention may be utilized.

According to the present example, the computer system includes a bus 1130, at least one processor 1105, at least one communication port 1110, a main memory 1115, a removable storage media 1140 a read only memory 1120, and a mass storage 1125.

Processor(s) 1105 can be any known processor, such as, but not limited to, an Intel® Itanium® or Itanium 2 processor(s), or AMD® Opteron® or Athlon MP® processor(s), or Motorola® lines of processors. Communication port(s) 1110 can be any of an RS-232 port for use with a modem based dialup connection, a 10/100 Ethernet port, or a Gigabit port using copper or fiber. Communication port(s) 1110 may be chosen depending on a network such a Local Area Network (LAN), Wide Area Network (WAN), or any network to which the computer system 1100 connects.

Main memory 1115 can be Random Access Memory (RAM), or any other dynamic storage device(s) commonly known in the art. Read only memory 1120 can be any static storage device(s) such as Programmable Read Only Memory (PROM) chips for storing static information such as instructions for processor 1105.

Mass storage 1125 can be used to store information and instructions. For example, hard disks such as the Adaptec® family of SCSI drives, an optical disc, an array of disks such as RAID, such as the Adaptec family of RAID drives, or any other mass storage devices may be used.

Bus 1130 communicatively couples processor(s) 1105 with the other memory, storage and communication blocks. Bus 1130 can be a PCI/PCI-X or SCSI based system bus depending on the storage devices used.

Optionally, operator and administrative interfaces 1135, such as a display, keyboard, and a cursor control device, may also be coupled to bus 1130 to support direct operator interaction with computer system 1100. Other operator and administrative interfaces can be provided through network connections connected through communication ports 1110.

Removable storage media 1140 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

The components described above are meant to exemplify some types of possibilities. In no way should the aforementioned examples limit the scope of the invention, as they are only exemplary embodiments.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A computer-implemented method comprising:

causing to be displayed on a display device, by a taxonomy mapping module, a list of a plurality of base taxonomy elements of a financial reporting taxonomy;

causing to be displayed on the display device, by the taxonomy mapping module, a taxonomy map including information regarding one or more extended taxonomy elements of a reporting entity that are not mapped to any base taxonomy elements of the plurality of base taxonomy elements, wherein the reporting entity comprises a business entity having reporting obligations to an oversight or regulatory agency;

responsive to one or more user input events corresponding to a selection of a base taxonomy element of the plurality of base taxonomy elements and corresponding to a request to map an extended taxonomy element of the one or more extended taxonomy elements to the selected base taxonomy element, a validation module, validating compatibility of the selected base taxonomy element with the extended taxonomy element;

if the validation module affirms the compatibility, then forming an association, by the taxonomy mapping module, between the extended taxonomy element and the selected base taxonomy element for the purpose of facilitating reporting of financial information by the reporting entity to the oversight or regulatory agency;

if the validation module determines the selected base taxonomy element is incompatible with the extended taxonomy element, then rejecting, by the taxonomy mapping module, the request to map the extended taxonomy element to the selected base taxonomy element and causing to be displayed on the display device information regarding a reason for said rejecting; and wherein the taxonomy mapping module and the validation module are implemented in one or more processors and one or more computer-readable storage media of one or more computer systems, the one or more computer-readable storage media having instructions tangibly embodied therein representing the taxonomy mapping module and the validation module that are executable by the one or more processors.

2. The method of claim 1, further comprising:

receiving, by a query processing module, a query involving the selected base taxonomy element; and responsive to receipt of the query and based on the association, adding to the query, by the query processing module, the extended taxonomy element prior to initiating a query resolution process.

3. The method of claim 1, wherein the taxonomy mapping module and the validation module are part of a web-based application.

4. The method of claim 1, wherein the taxonomy mapping module and the validation module are part of a reporting/analysis application integrated with a business document production application.

5. The method of claim 4, wherein the business document production application comprises a word processing application.

6. The method of claim 5, wherein the word processing application comprises Microsoft® Word.

7. The method of claim 4, wherein the business document production application comprises a spreadsheet application.

8. The method of claim 7, wherein the spreadsheet application comprises Microsoft® Excel.

9. The method of claim 1, wherein the one or more user input events represent a drag and drop in which the selected base taxonomy element is dragged and dropped onto a row of the taxonomy map corresponding to the extended taxonomy element.

10. The method of claim 1, wherein said validating compatibility comprises ensuring compatibility of data types of the selected base taxonomy element and the extended taxonomy element.

11. The method of claim 10, wherein said validating compatibility comprises ensuring compatibility of period types of the selected base taxonomy element and the extended taxonomy element.

12. The method of claim 1, wherein the list of the plurality of base taxonomy elements comprises a subset of elements from a base eXtensible Business Reporting Language (XBRL) taxonomy and wherein the plurality of base taxonomy elements including categories of data that are commonly incorporated into business documents.

13. The method of claim 12, wherein the one or more extended taxonomy elements represent a subset of an extension XBRL taxonomy and define (i) new categories of data not reflected by the base taxonomy elements or (ii) a different presentation of one or more categories of data than that of the base taxonomy elements.

14. A computer system comprising:

a display device;

a storage device having stored therein one or more routines operable to perform a method for mapping taxonomy elements; and one or more processors coupled to the storage device and the display device and operable to execute the one or more routines, wherein the method comprises:

causing to be displayed on a display device a list of a plurality of base taxonomy elements of a financial reporting taxonomy;

causing to be displayed on the display device a taxonomy map including information regarding one or more extended taxonomy elements of a reporting entity that are not mapped to any base taxonomy elements of the plurality of base taxonomy elements, wherein the reporting entity comprises a business entity having reporting obligations to an oversight or regulatory agency;

responsive to one or more user input events corresponding to a selection of a base taxonomy element of the plurality of base taxonomy elements and corresponding to a request to map an extended taxonomy element of the one or more extended taxonomy elements to the selected base taxonomy element, validating compatibility of the selected base taxonomy element with the extended taxonomy element;

if the compatibility is affirmed, then forming an association between the extended taxonomy element and the selected base taxonomy element for the purpose of facilitating reporting of financial information by the reporting entity to the oversight or regulatory agency; and if the compatibility is not affirmed then rejecting the request to map the extended taxonomy element to the selected base taxonomy element and causing to be displayed on the display device information regarding a reason for said rejecting.

15. The computer system of claim 14, wherein the method further comprises:

receiving a query involving the selected base taxonomy element; and responsive to receipt of the query and based on the association, adding to the query the extended taxonomy element prior to initiating a query resolution process.

16. The computer system of claim 14, wherein the one or more routines are part of a web-based application.

17. The computer system of claim 14, wherein the one or more routines are part of a reporting/analysis application integrated with a business document production application.

18. The computer system of claim 17, wherein the business document production application comprises a word processing application.

19. The computer system of claim 17, wherein the business document production application comprises a spreadsheet application.

20. The computer system of claim 18, wherein the word processing application comprises Microsoft® Word.

21. The computer system of claim 19, wherein the spreadsheet application comprises Microsoft® Excel.

22. The computer system of claim 14, wherein the one or more user input events represent a drag and drop in which the selected base taxonomy element is dragged and dropped onto a row of the taxonomy map corresponding to the extended taxonomy element.

23. The computer system of claim 14, wherein said validating compatibility comprises ensuring compatibility of data types of the selected base taxonomy element and the extended taxonomy element.

24. The computer system of claim 23, wherein said validating compatibility comprises ensuring compatibility of period types of the selected base taxonomy element and the extended taxonomy element.

25. The computer system of claim 14, wherein the list of the plurality of base taxonomy elements comprises a subset of elements from a base eXtensible Business Reporting Language (XBRL) taxonomy and wherein the plurality of base taxonomy elements including categories of data that are commonly incorporated into business documents.

26. The computer system of claim 25, wherein the one or more extended taxonomy elements represent a subset of an extension XBRL taxonomy and define (i) new categories of data not reflected by the base taxonomy elements or (ii) a different presentation of one or more categories of data than that of the base taxonomy elements.

27. A program storage device readable by a computer system, tangibly embodying a program of instructions executable by one or more processors of the computer system to perform method steps for mapping extended taxonomy elements to base taxonomy elements, said method steps comprising:

causing to be displayed on a display device a list of a plurality of base taxonomy elements of a financial reporting taxonomy;

causing to be displayed on the display device a taxonomy map including information regarding one or more extended taxonomy elements of a reporting entity that are not mapped to any base taxonomy elements of the plurality of base taxonomy elements, wherein the reporting entity comprises a business entity having reporting obligations to an oversight or regulatory agency;

responsive to one or more user input events corresponding to a selection of a base taxonomy element of the plurality of base taxonomy elements and corresponding to a request to map an extended taxonomy element of the one or more extended taxonomy elements to the selected base taxonomy element validating compatibility of the selected base taxonomy element with the extended taxonomy element for the purpose of facilitating reporting of financial information by the reporting entity to the oversight or regulatory agency;

if the compatibility is affirmed, then forming an association between the extended taxonomy element and the selected base taxonomy element; and if the compatibility is not affirmed then rejecting the request to map the extended taxonomy element to the selected base taxonomy element and causing to be displayed on the display device information regarding a reason for said rejecting.

28. The program storage device of claim 27, wherein the method further comprises:

receiving a query involving the selected base taxonomy element; and responsive to receipt of the query and based on the association, adding to the query the extended taxonomy element prior to initiating a query resolution process.

29. The program storage device of claim 27, wherein the program is part of a web-based application.

30. The program storage device of claim 27, wherein the program is part of a reporting/analysis application integrated with a business document production application.

31. The program storage device of claim 30, wherein the business document production application comprises a word processing application.

32. The program storage device of claim 30, wherein the business document production application comprises a spreadsheet application.

33. The program storage device of claim 31, wherein the word processing application comprises Microsoft® Word.

34. The program storage device of claim 32, wherein the spreadsheet application comprises Microsoft® Excel.

35. The program storage device of claim 27, wherein the one or more user input events represent a drag and drop in which the selected base taxonomy element is dragged and dropped onto a row of the taxonomy map corresponding to the extended taxonomy element.

36. The program storage device of claim 27, wherein said validating compatibility comprises ensuring compatibility of data types of the selected base taxonomy element and the extended taxonomy element.

37. The program storage device of claim 36, wherein said validating compatibility comprises ensuring compatibility of period types of the selected base taxonomy element and the extended taxonomy element.

38. The program storage device of claim 27, wherein the list of the plurality of base taxonomy elements comprises a subset of elements from a base eXtensible Business Reporting Language (XBRL) taxonomy and wherein the plurality of base taxonomy elements including categories of data that are commonly incorporated into business documents.

39. The program storage device of claim 38, wherein the one or more extended taxonomy elements represent a subset of an extension XBRL taxonomy and define (i) new categories of data not reflected by the base taxonomy elements or (ii) a different presentation of one or more categories of data than that of the base taxonomy elements.

* * * * *